A. STEWART.
GRIPPING DEVICE FOR TRACTOR WHEELS.
APPLICATION FILED DEC. 26, 1916.
1,232,730.
Patented July 10, 1917.
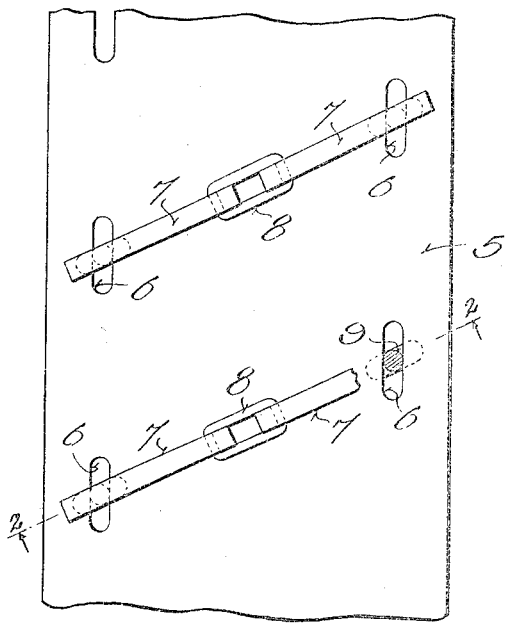
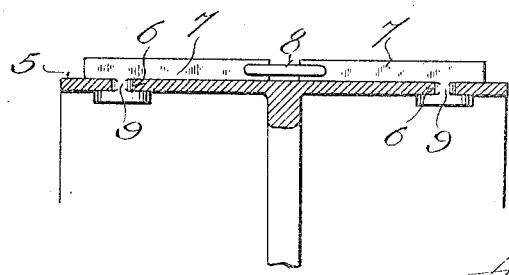

UNITED STATES PATENT OFFICE.

ALEXANDER STEWART, OF CLINTONVILLE, WISCONSIN, ASSIGNOR TO FOUR WHEEL TRACTOR CO., OF CLINTONVILLE, WISCONSIN.

GRIPPING DEVICE FOR TRACTOR-WHEELS.

1,232,730. Specification of Letters Patent. Patented July 10, 1917.

Application filed December 26, 1916. Serial No. 138,923.

*To all whom it may concern:*

Be it known that I, ALEXANDER STEWART, a citizen of the United States, and resident of Clintonville, in the county of Waupaca and State of Wisconsin, have invented certain new and useful Improvements in Gripping Devices for Tractor-Wheels; and I do hereby declare that the following is a full, clear, and exact description thereof.

The present invention relates to new and useful improvements in gripping devices for tractor wheels and is more particularly directed to the provision of calk members, on the tread surface of the wheel which are shiftable to dislodge accumulations of mud or other substances liable to impair their gripping action.

It is primarily the object of the present invention to provide a means for securing shiftable calk members on the rim of a tractor wheel in a manner whereby the attaching means of the various calk members are relatively independent, to provide for individual attachment and detachment thereof.

It is further an object to provide such individually attachable shiftable calk members which are of an exceedingly simple nature and are adapted for most ready association with a wheel rim.

With the above and other objects and advantages in view, the invention resides more particularly in the novel combination, formation and arrangement of parts hereinafter described and pointed out in the appended claims.

In the drawings:

Figure 1 is an elevational view of the rim portion of a tractor wheel showing a plurality of my improved calk members associated therewith.

Fig. 2 is a transverse sectional view through the rim of the wheel on the line 2—2 of Fig. 1.

Referring now more particularly to the accompanying drawings, 5 designates the transversely flat rim portion of a tractor wheel, and to provide for the securement of my improved calk members thereto, said rim portion is provided adjacent each side with a regularly spaced series of longitudinally elongated slots 6, the slots of the series being preferably arranged in staggered relation.

The calk members comprise pairs of bars 7 adapted for connection at adjacent ends preferably by loop links 8, passed through said ends. The outer ends of the bars are provided with laterally projecting buttons 9 having head portions extended longitudinally of the bars and adapted to pass through corresponding slots 6 of the wheel rim, whereby upon turning the bars to extend transversely of the wheel, the buttons are interlockingly slidably engaged with the rim.

In assembling the calk members on the rim, the buttons of each pair of bars are inserted in the slot 6, and the bars then turned in alinement and secured together at their adjacent ends by the links 8. Thus each connected pair of bars is permitted a limiting sliding movement longitudinally of the rim, and upon propulsion of the wheel, the bars are imparted reciprocal sliding movement within the limits of the slots 6 to prevent accumulations of mud or other substances liable to impair their gripping action.

What is claimed is:

1. The combination with a wheel rim provided with a pair of elongated slots, of a calk member slidably movable throughout its length longitudinally of the slots, said member including portions to be slidably disposed in said slots, said portions holding the calk member against axial twisting and in sliding contact with said wheel rim.

2. The combination with a wheel rim, of calk members including portions adapted for interlocking engagement with the rim upon relative rotation of the calk members and means for securing adjacent calk members together to retain said interlocking relation.

3. The combination with a wheel rim, of calk members including portions adapted for slidable interlocking engagement with the rim upon relative rotation of the calk members and means for securing adjacent calk members together to retain said interlocking relation.

4. The combination with a wheel rim, of a calk member including portions for interlocking engagement with the rim upon relative rotation of the calk members, and loop links for securing the adjacent calk members together to retain said interlocking relation.

In testimony that I claim the foregoing I have hereunto set my hand at Clintonville, in the county of Waupaca and State of Wisconsin, in the presence of two witnesses.

ALEXANDER STEWART.

Witnesses:
F. M. HYDE,
LEVI C. LARSON.

Copies of this patent may be obtained for five cents each, by addressing the "Commissioner of Patents, Washington, D. C."